Oct. 16, 1928.
L. F. CORLISS
1,687,970
LIQUID CONTROLLED GYROSCOPIC COMPASS
Filed Dec. 27, 1923     2 Sheets-Sheet 1
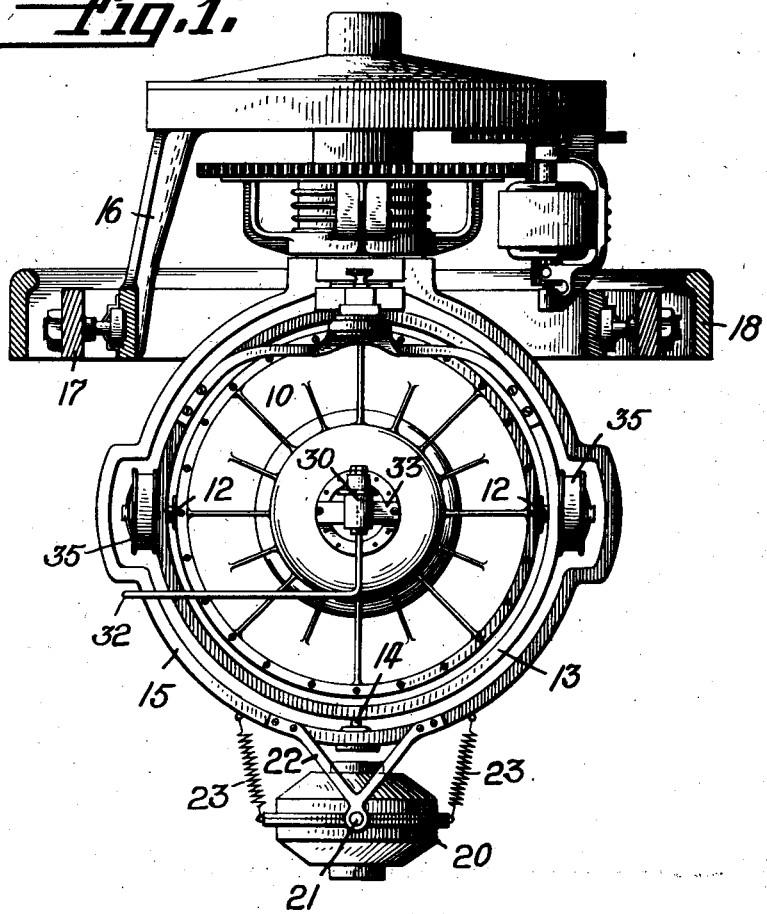
Inventor
Louis F. Corliss.
By Attorney
Herbert H. Thompson Oct. 16, 1928.
L. F. CORLISS
1,687,970
LIQUID CONTROLLED GYROSCOPIC COMPASS
Filed Dec. 27, 1923   2 Sheets-Sheet 2
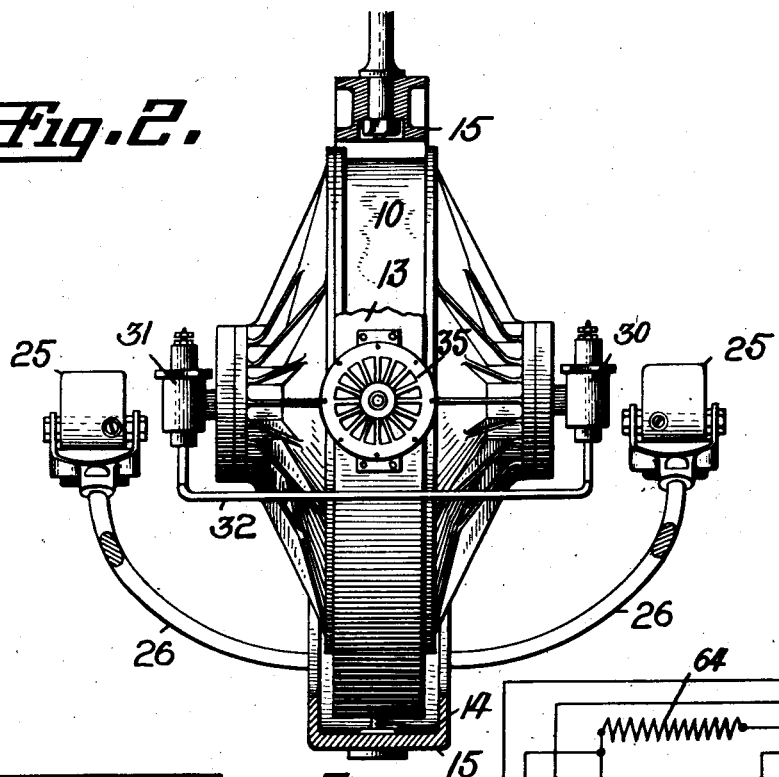
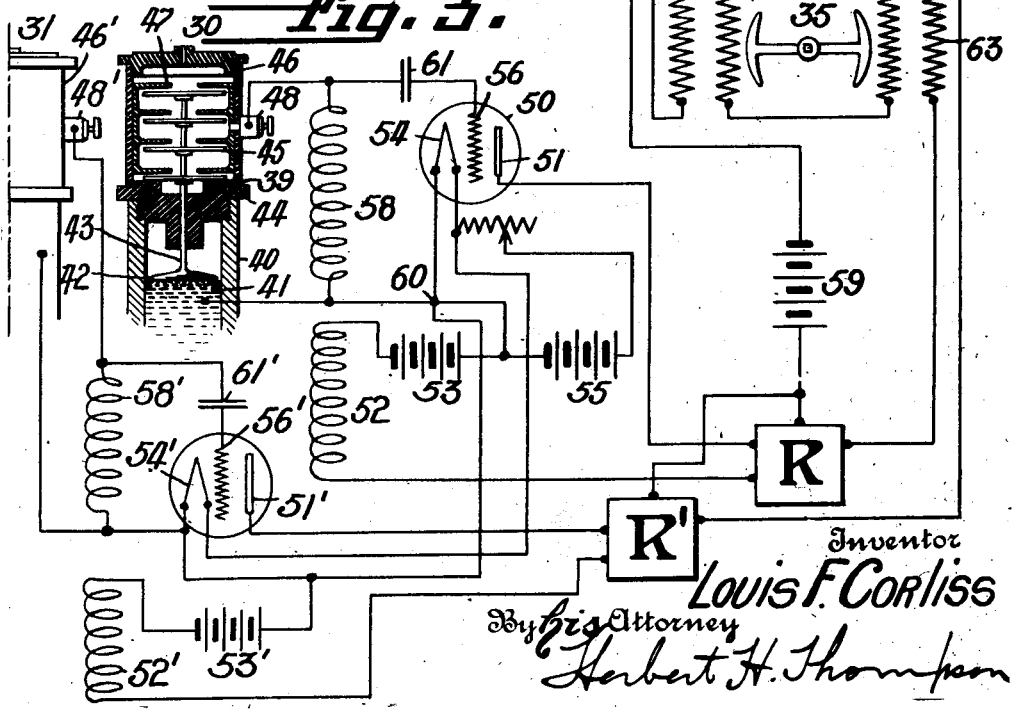
Inventor
Louis F. Corliss
By his Attorney
Herbert H. Thompson Patented Oct. 16, 1928.

1,687,970

UNITED STATES PATENT OFFICE.

LOUIS F. CORLISS, OF SOUTH TAMWORTH, NEW HAMPSHIRE, ASSIGNOR TO THE SPERRY GYROSCOPE COMPANY, OF BROOKLYN, NEW YORK, A CORPORATION OF NEW YORK.

LIQUID-CONTROLLED GYROSCOPIC COMPASS.

Application filed December 27, 1923. Serial No. 682,861.

This invention relates to gyroscopic direction indicating apparatus and more especially to that type of such apparatus having a positive directive power, that is, a gyroscopic compass which will seek the meridian if displaced therefrom. My invention has application, however, to many classes of gyroscopic apparatus.

Heretofore, the gyroscope employed in such an instrument has had three degrees of freedom, a normally horizontal axis of oscillation and a vertical axis, but the freedom about said horizontal axis has been suppressed by gravity. In any position of the gyro, except when its axis is in the meridian on the Equator, the movement of the earth from under the gyro results in apparent movement of the axis in azimuth accompanied by a tilt. By making the gyro pendulous to a predetermined extent, there is exerted, upon apparent tilting of the gyro due to the earth's rotation, a torque about its horizontal axis of support, which causes precession of the gyroscope about its vertical axis, tending to return (or maintain) the axis of the gyroscope into coincidence with the meridian. One type of pendulous force heretofore employed, was the so-called mercury ballistic system, so that upon tilting of the gyroscope, mercury flowed to the low side of the system to set up a torque about the horizontal supporting axis of the gyro, to cause precession about the vertical precession axis, the gyro being rotated in the proper direction so that precession took place towards the meridian. The mass of the mercury necessary to apply a given torque sufficient to cause the desired amount of precession gave rise to certain errors, such as those due to acceleration and centrifugal forces. In the present invention therefore, I propose to practically eliminate all pendulous factors on which forces causing deviation may act, using a level merely as an indicator of the gyroscope tilt, that is, an indicator of the deviation of the gyro spinning axis from the meridian and employ such indicator to actuate other suitable mechanism not affected by the forces above mentioned which previously gave rise to error, to apply the necessary directive force to the gyroscope.

My invention consists further in employing a system whereby a large directive force is applied to the gyroscope when the latter deviates from the meridian by even a small amount. In gyroscopic compasses heretofore employed, gravity action was relied upon and hence a small deviation of the gyroscope from the meridian accompanied by only a small displacement of mercury resulted in a comparatively weak restoring force for such small deviations of the compass.

It is a further object of my invention to employ in connection with the gyroscopic indicator, a means for controlling the actuation of a torque applying mechanism, or other power means for performing a function with respect to the apparatus which control means is extremely sensitive to even very slight deviations of the compass. For this purpose I employ an oscillatory electric circuit which may be of the type employed in radio. It is well known in the art that the tuning of such circuits can be made extremely delicate.

Other objects and advantages of this invention will become apparent in the following detailed description of the invention. In the accompanying drawings;

Fig. 1 is a front elevation, partly sectioned vertically, of a gyroscope direction indicating instrument embodying my invention.

Fig. 2 is a side view, partly sectioned vertically, and with parts removed, of the device shown in Fig. 1.

Fig. 3 is a view largely diagrammatic, showing the wiring forming part of my invention.

Referring to the drawings, there is shown in Fig. 1 a gyroscope mounted on a horizontal spinning axis within a casing 10, the spinning axis being positioned normally in a north-south direction (perpendicular to the plane of the paper in Fig. 1). Said gyro-casing is in turn mounted for oscillation about a horizontal axis at right angles to the spinning axis by means of trunnions 12 journaled in a vertical ring 13, oscillatably mounted about a vertical axis 14 at right angles to the two aforesaid horizontal axes, within a follow-up ring 15. Said ring is supported from a spider frame 16 which is in turn supported within a set of gimbal rings 17, 18. The follow-up ring 15 and vertical ring 13 may be stabilized by means of a relatively small stabilizing gyroscope 20 pivotally supported on an axis 21 within a bracket 22 fixed to said ring 15. The stabilizing gyroscope may be centralized by means of centralizing springs 23 connecting said gyroscope on opposite sides to said ring 15. The follow-up ring 15 and the vertical ring 13 thus in effect form a stabilized base line or long period pendulum in the N. S. plane. Suitable weights 25, 25 supported upon arms 26 connected to the vertical ring 13 may be provided to equalize the moments of inertia.

To impart directive power to the instrument suitable mechanism is employed for applying a torque about the supporting axis 12, 12 of the gyro casing whenever the spinning axis of the gyroscope deviates from a predetermined position with respect to the horizontal. I employ a tilt-responsive mechanism as an actuator for suitable torque applying means which is not subject to the error which has heretofore resulted from the use of pendulous bodies.

My tilt responsive mechanism comprises a set of small reservoirs 30, 31 supported in brackets 33 upon the gyro casing, one adjacent each end of the gyro spinning axis. The reservoirs are interconnected by a relatively small restricted passage 32 so that upon prolonged tilt of the gyroscope, fluid will be transferred from the reservoir on the high side to the reservoir on the low side.

The passage 32 is a restricted passage so that incidental and immaterial transmission of fluid cannot take place, the device being responsive only to definite long-period tilt of the gyro-axis, or to a continued acceleration pressure. It will be apparent that as the earth rotates from beneath the gyroscope, the gyro axis will depart from the meridian and said departure will be accompanied by a constantly increasing tilt, the result of which is the transfer of fluid from the reservoir on the high side to the reservoir on the low side.

Such transfer of fluid from one reservoir to another I utilize to actuate suitable torque applying mechanism. Said mechanism may take the form of two-way motors 35 (which may be similar to the motors shown in Fig. 5 of the patent to H. L. Tanner, No. 1,309,591, July 8, 1919), mounted one upon each trunnion 12 and connected in parallel so that both motors will tend to rotate the gyro casing in the same directon about the axis 12, 12 to cause precession about the vertical axis 14 to restore the gyroscope axis into the meridian. The mass of fluid transferred through the passage 32 is made so small that it has practically no gravitational effect on the gyroscope. It will be understood that other torque-applying means such as fluid jets or springs may be employed without departing from my invention. In the present instance, I employ electro-magnetic devices, that is motors 35, and in order to cause said motors to be actuated in response to the tilt of the gyroscope I employ some means for closing the circuit through said motor in one direction or the other, as the case requires, when fluid passes from one reservoir into the other. The motor actuating means which I employ is designed to be extremely sensitive, quick to respond to the slightest tilt of the gyro-compass and which instantly applies a restoring torque to the gyro-casing supporting axis, regardless of the smallness of such tilt. For this purpose, each of the reservoirs or condensers 30, 31 is provided with a reservoir portion 40 which is adapted to be partially filled normally by the fluid 41, said fluid supporting a float 42, the stem 43 of which passes through an insulating cap 44 on said reservoir portion 40, said stem being provided beyond said cap 44 with a plurality of condenser plates 45. The upper portion of the cap 44 is in the form of a cylinder 46 within which is positioned a member having a set of plates 47 cooperating with the set of plates 45, but separated therefrom by some suitable medium to form the dielectric of a condenser. The amount of fluid within the reservoir portions 40 is so adjusted that normally the lowermost plate 45 of the float rests upon the base 39 of cap 44 so that the plates 45 are in a predetermined relation to plates 47, and the condenser thus formed is of a predetermined capacity. It will be understood that when liquid flows from one of the reservoirs 30, 31 into the other, the float in the lower reservoir rises to increase the capacity of said condenser. The float in the higher reservoir would obviously tend to descend, but is prevented from so doing by the contact of its lowermost plate 45 with the base 39. Each condenser is supplied with suitable contacts 48, for conducting electric charges thereto.

In order to utilize the change of capacity as the means for actuating the motors, I employ an electrical oscillatory system which may be of the type employed in certain wireless systems and comprise a plurality of circuits capable of being rendered synchronous to set up an oscillation. While said circuit is capable of a large number of variations, I herein describe one suitable circuit. Said circuit comprises a multi-electrode, audion tube or valve 50, the plate circuit normally extending from the plate 51 through a relay R to a coil 52, a suitable source of E. M. F. such as a battery 53, and thence to the filament 54. Said filament may be heated by its own source of E. M. F. such as a battery 55. The circuit through the grid 56 includes the condenser formed within the reservoir 30 and an induction coil 58, the grid circuit being connected as at 60 to the plate circuit. A condenser 61 may be interposed between coil 58 and the grid 56. A relay R is connected to one set of armature windings 63 of the motors 35, the field winding being indicated at 64. The other set of armature windings 64 of the motors 35 adapted to drive the motors in the opposite direction are connected to relay R' which is actuated from reservoir 31 through a circuit which may be similar to the one hereinbefore described as actuating relay R and indicated by the same numerals primed. Current for the relays may be provided by battery 59. The two circuits may be suitably tied up, as shown, to simplify the wiring. It will be understood that the above described radio oscillatory system and circuits may be employed for other purposes on the gyro compass than the specific purpose above described within the scope of the appended claims.

The operation of my device is as follows: As is well known in a system as hereinbefore described, when the plate circuit is closed, the rising current in the circuit causes coil 52 to induce a current in coil 58 which places a charge upon grid 56 which in turn sets up an oscillation in the plate circuit, this being the well-known action of the three element tube. It is understood that this oscillation in the plate circuit takes place practically immediately upon closing the circuit, causing a drop in current within said circuit, so that the current is insufficient to actuate relay R. It is understood that the capacity of the condenser within reservoirs 30, 31 is originally regulated as hereinbefore described, so that the frequency of the grid circuit is in tune with the oscillations in the plate circuit. In this manner when there is no tilt of the gyro axis, the oscillations in the plate circuit will be maintained with a consequent drop of current in said plate circuit and inoperativeness of relay R. Upon tilt of the gyro axis however, liquid flows from one reservoir to the other and there is a tendency for the float in one reservoir to be carried upwardly to increase the capacity of the respective condenser and the flow in the other reservoir to be carried downwardly to decrease the capacity of the respective condenser. The latter is rendered impossible by the fact that the float normally rests on base 39 and cannot descend. So that, in this case, the condenser of increased capacity, i. e., the condenser on the low side of the liquid-level system is the effective one. The system is so tuned that the slightest increase in the capacity of a condenser will cause the respective coil 58, 58' to drop out of tune with coil 52, 52' so that the oscillation will no longer be sustained within the plate circuit, the current will rise and the relay R or R' as the case may be, will be actuated to close the circuit through the armature windings 63 or 64, respectively, to apply the necessary torque in one direction or the other. It is apparent of course that the reservoir on the high side of the tilted axis could be made the operative one by merely reversing the structure within the reservoir condensers, that is by limiting the upward movement of the float above the normal position rather than the downward movement as shown. This construction is obvious. Also, while the system has been described as being rendered operative when the synchronism of the circuits is destroyed and inoperative when the circuits are synchronous, it is apparent that the reverse conditions may be utilized, so that the torque-applying means would be rendered operative when the circuits are synchronous and inoperative when the synchronism of the circuits is destroyed. It will also be apparent that the torque applied upon a tilt of the gyroscope may be in the same or reverse direction as normally applied by gravity, the gyro-wheel being revolved in the same or the opposite direction as the earth in the two cases.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention what I claim and desire to secure by Letters Patent is, 1. In a gyroscopic compass, a gyroscope mounted with three degrees of freedom, means responsive to deviation of the gyro axis from the meridian, means for applying a torque to said gyroscope, and means including an oscillatory electric circuit whereby said first means controls said second means.

2. In a gyroscopic compass, a gyroscope mounted with three degrees of freedom, means responsive to deviation of the gyro axis from the meridian, means for applying a torque to said gyroscope, means actuated by said first means and including a condenser and an oscillatory electric circuit for rendering said second means effective or ineffective, said means being so designed that the oscillations set up in said circuit when the gyro axis is on the meridian are different than when said gyro axis deviates from the meridian.

3. In a gyroscopic compass, a gyroscope mounted with three degrees of freedom, means responsive to deviation of the gyro axis from the meridian, means for applying a torque to said gyroscope, control means for said second means, means actuated by said first means and including a variable condenser and oscillatory electric circuits for actuating said control means, said means including a circuit which is rendered synchronous when the gyro axis is in the meridian and said synchronism is destroyed when said gyro axis deviates from the meridian, said control means being adapted to be actuated when said synchronism is destroyed.

4. In a gyroscopic compass, a gyroscope mounted with three degrees of freedom, liquid-level means responsive to deviation of the gyro axis from the meridian, means for applying a torque to said gyroscope, and means including an oscillatory electric circuit whereby said first means controls said second means.

5. In a gyroscopic compass, a gyroscope mounted with three degrees of freedom, liquid level means responsive to deviation of the gyro-axis from the meridian, means for applying a torque to said gyroscope, means including oscillatory electric circuits for controlling said second means, and means whereby said liquid-level means controls said circuit means.

6. In a gyroscopic compass, a gyroscope mounted with three degrees of freedom, liquid level means responsive to tilt of the gyro-axis, means for applying a torque to said gyroscope, means including oscillatory electric circuits for controlling said second means, and means whereby the lower end of said liquid-level means controls said circuits.

7. In a gyroscopic apparatus, a gyroscope mounted with three degrees of freedom, means for applying a torque to said gyroscope, means for controlling said first means including a multi-electrode audion tube including a filament, a grid and a plate, a plate circuit, a grid circuit normally in synchronism with said plate circuit to set up oscillations therein, means whereby change in the inclination of the gyroscope destroys the synchronism of said circuits, and means whereby said first means is actuated when synchronism of said circuits is destroyed.

8. In a gyroscopic apparatus, a gyroscope mounted with three degrees of freedom, means for applying a torque to said gyroscope, means for controlling said first means including a multi-electrode audion tube comprising a filament, a grid, and a plate, a plate circuit, a grid circuit normally in synchronism with said plate circuit to set up oscillations therein, said grid circuit including a condenser, and means whereby change in inclination of the gyroscope varies the capacity of said condenser to destroy the synchronism of said circuits, and means whereby said first means is actuated when synchronism of said circuits is destroyed.

9. In a gyroscopic apparatus, a gyroscope mounted with three degrees of freedom, liquid-level means responsive to changes in inclination of the gyroscope, means for applying a torque to said gyroscope, means for controlling said second means including a multi-electrode audion tube comprising a filament, a grid, and a plate, a plate circuit, a grid circuit normally in synchronism with said plate circuit to set up oscillations therein, said grid circuit including a condenser, and means whereby said liquid-level means controls the capacity of said condenser to destroy the synchronism of said circuits when the gyro axis deviates from the horizontal, and means whereby said second means is actuated when synchronism of said circuits is destroyed.

10. In a gyroscopic apparatus, a gyroscope mounted with three degrees of freedom, means for applying a torque to said gyroscope in either of two directions, liquid-level means responsive to changes in inclination of the gyroscope, means controlled by said liquid level means when tilted in one direction for operating said first means in one direction, means controlled by said liquid-level means when tilted in the other direction, each of said last two means including normally synchronous electric circuits, means whereby deviation of the gyro axis from the horizontal destroys the synchronism of said circuits, and means whereby said first means is actuated when synchronism of said circuits is destroyed.

11. In a gyroscopic apparatus, a gyroscope mounted with three degrees of freedom, means for applying a torque to said gyroscope in either of two directions, liquid-level means responsive to changes in inclination of the gyroscope, means controlled by said liquid level means when tilted in one direction for operating said first means in one direction, means controlled by said liquid level means when tilted in the other direction for operating said first means in the other direction, each of said last two means including a multi-electrode audion tube comprising a filament, a grid and a plate, a plate circuit, a grid circuit normally in synchronism with said plate circuit to set up oscillations therein, said grid circuit including a condenser, means whereby said liquid-level means controls the capacity of said condenser to destroy the synchronism of said circuits when the gyro axis deviates from the horizontal, and means whereby said second means is actuated when synchronism of said circuits is destroyed.

12. In a gyroscopic apparatus, a gyroscope mounted with three degrees of freedom, means for applying a torque to said gyroscope in either of two directions, liquid-level means responsive to changes in inclination of the gyroscope and including a set of reservoirs, floats therein, and a condenser carried by each float, means controlled by one of said condensers for operating said first means in one direction, means controlled by the other condenser for operating said first means in the other direction, each of said last two means comprising normally synchronous electric circuits including one of said condensers, respectively, means whereby deviation of the gyro axis from the horizontal varies the capacities of said condensers to destroy the synchronism of said circuits, means for rendering only one of said condensers effective, and means whereby said first means is actuated when synchronism is destroyed.

13. In a gyroscopic apparatus, a gyroscope mounted with three degrees of freedom, means for applying a torque to said gyroscope in either of two directions, liquid-level means responsive to changes in inclination of the gyroscope including a set of reservoirs, floats therein, and a condenser carried by each float, means controlled by one of said condensers for operating said first means in one direction, means controlled by the other condenser for operating said first means in the other direction, each of said last two means comprising normally synchronous electric circuits including one of said condensers, respectively, means whereby deviation of the gyro axis from the horizontal varies the capacities of said condensers to destroy the synchronism of said circuits, means for rendering only the condenser of increased capacity effective, and means whereby said first means is actuated when synchronism is destroyed.

14. In a gyroscopic apparatus, a gyroscope mounted with three degrees of freedom, means for applying a torque to said gyroscope in either of two directions, liquid-level means responsive to changes in inclination of the gyroscope including a set of reservoirs, floats therein, and oppositely-acting condensers carried by the floats, means controlled by one of said condensers for operating said first means in one direction, means controlled by the other condenser for operating said first means in the other direction, each of said last two means comprising normally synchronous electric circuits, including one of said condensers, respectively, means whereby deviation of the gyro axis from the horizontal varies the capacities of said condensers to destroy the synchronism of said circuits, means for preventing only the condenser at the high end of the liquid-level from changing its capacity means effective, and means whereby said first means is actuated when synchronism is destroyed.

15. In a gyroscopic apparatus, a gyroscope mounted with three degrees of freedom including a horizontal axis, means responsive to changes in inclination of the gyroscope about said axis, means for applying a torque to said gyroscope about its horizontal axis, and means including an oscillatory electric circuit whereby said first means controls said second means.

16. In a gyroscopic apparatus, a gyroscope mounted with three degrees of freedom, means responsive to changes in inclination of the gyroscope, means for applying a torque to said gyroscope and means actuated by said first means and including an oscillatory electric circuit for rendering said second means effective or ineffective.

17. In a gyro-compass, means for mounting the same for freedom about a plurality of axes, power means for performing a function with respect thereto, and means controlled by the position of the gyroscope about one of said axes for governing said power means comprising an oscillatory circuit including a variable condenser and an audion tube.

18. In a gyro-compass, means for mounting the same for freedom about a plurality of axes, power means for performing a function with respect thereto, and means controlled by the position of the gyroscope about one of said axes for governing said power means comprising an oscillatory circuit, including a variable condenser and an audion tube, the relative position of the plates of said condenser being varied by changes in the position of the gyroscope about said axis.

19. In a gyro-compass, means for mounting the same for freedom about a plurality of axes, power means for performing a function with respect thereto, and means controlled by the position of the gyroscope about one of said axes for governing said power means comprising a pair of oscillatory circuits including variable condensers and audion tubes, and means responsive to a decrease in the oscillations in one circuit for driving the power means in one direction and for driving said means in the opposite direction upon decrease in the oscillations in the other circuit.

20. In a gyroscopic apparatus, a gyroscope, means for mounting the same with three degrees of freedom, means responsive to changes in position of the gyroscope about one of the axes of freedom, power means for performing a function with respect to said gyroscope, and means actuated by said first means and including an oscillatory electric circuit for rendering said second means effective or ineffective.

21. In a gyro-compass, means for mounting the same for freedom about a plurality of axes, power means for performing a function with respect thereto, and means controlled by the position of the gyroscope about one of said axes for governing said power means comprising a pair of oscillatory circuits including variable condensers and audion tubes, one element of each condenser being connected to the gyroscope so as to be moved relatively to the other element upon change in position thereof, means responsive to a change in the intensity of the oscillations in one circuit for driving the power means in one direction and means responsive to a change in the intensity of the oscillations in the other circuit for driving the power means in the other direction.

In testimony whereof I have affixed my signature.

LOUIS F. CORLISS.